US012802116B2

(12) United States Patent
Shi et al.

(10) Patent No.: US 12,802,116 B2
(45) Date of Patent: Nov. 17, 2026

(54) INFORMATION PROCESSING APPARATUS AND INFORMATION PROCESSING METHOD FOR PREDICTING PREFERENCE OF USER GROUP

(71) Applicant: Rakuten Group, Inc., Tokyo (JP)

(72) Inventors: Yang Shi, San Mateo, CA (US); Young Joo Chung, San Mateo, CA (US)

(73) Assignee: Rakuten Group, Inc., Tokyo (JP)

( * ) Notice: Subject to any disclaimer, the term of this patent is extended or adjusted under 35 U.S.C. 154(b) by 109 days.

(21) Appl. No.: 18/613,661

(22) Filed: Mar. 22, 2024

(65) Prior Publication Data

US 2025/0299239 A1 Sep. 25, 2025

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ....................... G06Q 30/0631; G06Q 30/0625
See application file for complete search history.

(56) References Cited

U.S. PATENT DOCUMENTS

2021/0110436 A1* 4/2021 Sankar .................. H04L 67/535
2022/0245700 A1* 8/2022 Wadhwa ............ G06Q 30/0631

OTHER PUBLICATIONS

M. Sangeetha et al., "Developing Algorithms for Personalized Recommendations Based on User Behavior," 2023 5th International Conference on Inventive Research in Computing Applications (ICIRCA), Coimbatore, India, 2023, pp. 1152-1158, doi: 10.1109/ICIRCA57980.2023. (Year: 2023).*

Aravind Sankar et al., "GroupIM: A Mutual Information Maximization Framework for Neural Group Recommendation", Proceedings of the 43rd International Association for Computing Machinery's Special Interest Group on Information Retrieval (ACM SIGIR) Conference on Research and Development in Information Retrieval, Jul. 2020, pp. 1279-1288.

* cited by examiner

*Primary Examiner* — Anand Loharikar
(74) *Attorney, Agent, or Firm* — Sughrue Mion, PLLC

(57) ABSTRACT

In order to predict a preference that is representative of a group to which users belong more appropriately with higher accuracy based on preferences of the users for items, disclosed herein is an information processing apparatus, comprising: an encoding unit configured to encode a behavior history of a user for an item to generate a first embedding for each user; a weighting unit configured to derive a weight for each user based on information on a price of the item and the behavior history, and weight the first embedding generated by the encoding unit with the derived weight; and an aggregation unit configured to aggregate the first embedding weighted by the weighting unit to generate, for a group to which the user belongs, a second embedding indicating a preference of the group for the item.

13 Claims, 10 Drawing Sheets

INFORMATION PROCESSING APPARATUS AND INFORMATION PROCESSING METHOD FOR PREDICTING PREFERENCE OF USER GROUP

TECHNICAL FIELD

The present invention relates to an information processing apparatus and an information processing method for predicting a preference of a user group, and in particular, to techniques for recommending items to a plurality of users belonging to a user group based on the predicted preference of the user group.

BACKGROUND ART

In electronic commerce (i.e., e-commerce) platforms, a large number of e-commerce sites constructed on the Web routinely provide users with a large number of items, such as products and services, to browse. Many of those e-commerce sites implement a recommendation system that displays items that are determined based on the user's past purchase history and the user's attribute information, and which are predicted to be purchased by the user, as recommended items on the screen that the user is browsing.

Personalized item recommendations are more likely to attract the user's attention and contribute significantly to the user's decision to purchase the item concerned, thereby increasing the effectiveness of the advertisement.

One of those methods of recommending items is group recommendation. In such group recommendation, a large number of users who use e-commerce sites are segmented, and for each of segmented groups of users (hereinafter also referred to as "user group(s)"), items that are more suitable for that user group are individually recommended. By providing different and optimized advertising campaigns for different user groups, it is expected to enhance the effectiveness of digital marketing for the entire users belonging to the same group.

In this group recommendation, the ability to accurately predict a preference that is representative of a user group consisting of a large number of users will greatly affect sales of the item concerned and related items on the e-commerce sites.

Non-Patent Literature 1 discloses a group recommendation system that predicts the preference of a user group as a whole for an item by aggregating the preferences of multiple users belonging to the user group for the item.

More specifically, the group recommendation system disclosed in Non-Patent Literature 1 uses a neural network to derive the preferences of multiple users belonging to a certain user group, aggregates the derived preferences of multiple users to derive a preference that is representative of the user group, and predicts items that better match the derived preference of the user group.

The group recommendation system disclosed in Non-Patent Literature 1 further employs a classifier network that is pre-trained to discriminate preferences for items more significantly between users who are members of a user group and non-members who are not members of that user group. Using this classifier network, the group recommendation system disclosed in Non-Patent Literature 1 assigns weights to the preferences of respective users belonging to a user group, and aggregates the weighted preferences of respective users to derive a preference that is representative of that user group.

LISTING OF REFERENCES

Non-Patent Literature

NON-PATENT LITERATURE 1: Aravind Sankar, et. al, "GroupIM: A Mutual Information Maximization Framework for Neural Group Recommendation", Proceedings of the 43rd International Association for Computing Machinery's Special Interest Group on Information Retrieval (ACM SIGIR) Conference on Research and Development in Information Retrieval, pp. 1279-1288 July 2020

SUMMARY OF THE INVENTION

Problems to be Solved by the Invention

The technique disclosed in Non-Patent Document 1 attempts to discriminate a user who is more influential in the decision making of a user group from other users when deriving the preference of the user group as a whole, and to assign a greater weight to the discriminated user. This ensures that the preference of a user who is given a greater weight is more likely to influence the preference of the user group as a whole.

However, a large number of users frequently use e-commerce sites on the e-commerce platforms, and their respective attributes are quite diverse.

When a user group is built through persistent relationships such as family, friends, and colleagues, it is relatively easy to predict a preference as a user group because such users are closely related to each other and often engage in the same activities. Also, even for user groups built through ephemeral relationships, such as participants in a conference or meeting, it is easy to predict common preferences because they share at least temporarily the same time and place and share common interests.

In contrast, in terms of users of e-commerce sites, a large number of users of e-commerce sites are segmented in principle based on a very small portion of user attributes, e.g., user age group, residential region, and the like, while a large number of users are geographically dispersed. Therefore, unlike the real-world user groups described above, user groups consisting of users of e-commerce sites inherently lack commonality of preferences.

Furthermore, unlike the real-world user groups described above, such user groups consisting of users of e-commerce sites have little direct interrelationship among users, and there is almost no history of users taking the same action at the same time. This makes it more difficult to discriminate more influential users within a user group and is likely to reduce the accuracy of predicting preferences of the user group.

Inter alia, when a user group consists of a large number of users who are not interrelated to each other on a large-scale e-commerce platform, it will increase the likelihood that the item recommended to the user group based on the predicted preference of the user group will not be attractive enough to stimulate the users' willingness to purchase.

The present invention has been made in order to solve the above mentioned problems and an object thereof is to provide an information processing apparatus and an information processing method that are capable of predicting a preference that is representative of a group to which users belong more appropriately with higher accuracy based on preferences of users for items.

Solution to Problems

In order to solve the above mentioned problems, according to one aspect of the present invention, there is provided an information processing apparatus, comprising: an encoding unit configured to encode a behavior history of a user for an item to generate a first embedding for each user; a weighting unit configured to derive a weight for each user based on information on a price of the item and the behavior history, and weight the first embedding generated by the encoding unit with the derived weight; and an aggregation unit configured to aggregate the first embedding weighted by the weighting unit to generate, for a group to which the user belongs, a second embedding indicating a preference of the group for the item.

According to another aspect of the present invention, there is provided an information processing method executed by an information processing apparatus, comprising steps of: encoding a behavior history of a user for an item to generate a first embedding for each user; deriving a weight for each user based on information on a price of the item and the behavior history, and weighting the first embedding with the derived weight; and aggregating the weighted first embedding to generate, for a group to which the user belongs, a second embedding indicating a preference of the group for the item.

According to yet another aspect of the present invention, there is provided a computer readable storage medium storing an information processing program for causing a computer to execute information processing, the information processing program causing the computer to execute processing comprising: an encoding process for encoding a behavior history of a user for an item to generate a first embedding for each user; a weighting process for deriving a weight for each user based on information on a price of the item and the behavior history, and weight the first embedding generated by the encoding process with the derived weight; and an aggregation process for aggregating the first embedding weighted by the weighting process to generate, for a group to which the user belongs, a second embedding indicating a preference of the group for the item.

Advantageious Effect of the Invention

According to the present invention, it makes it possible to derive a preference that is representative of a group to which users belong more appropriately with higher accuracy based on preferences of users for items.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Figure 1:
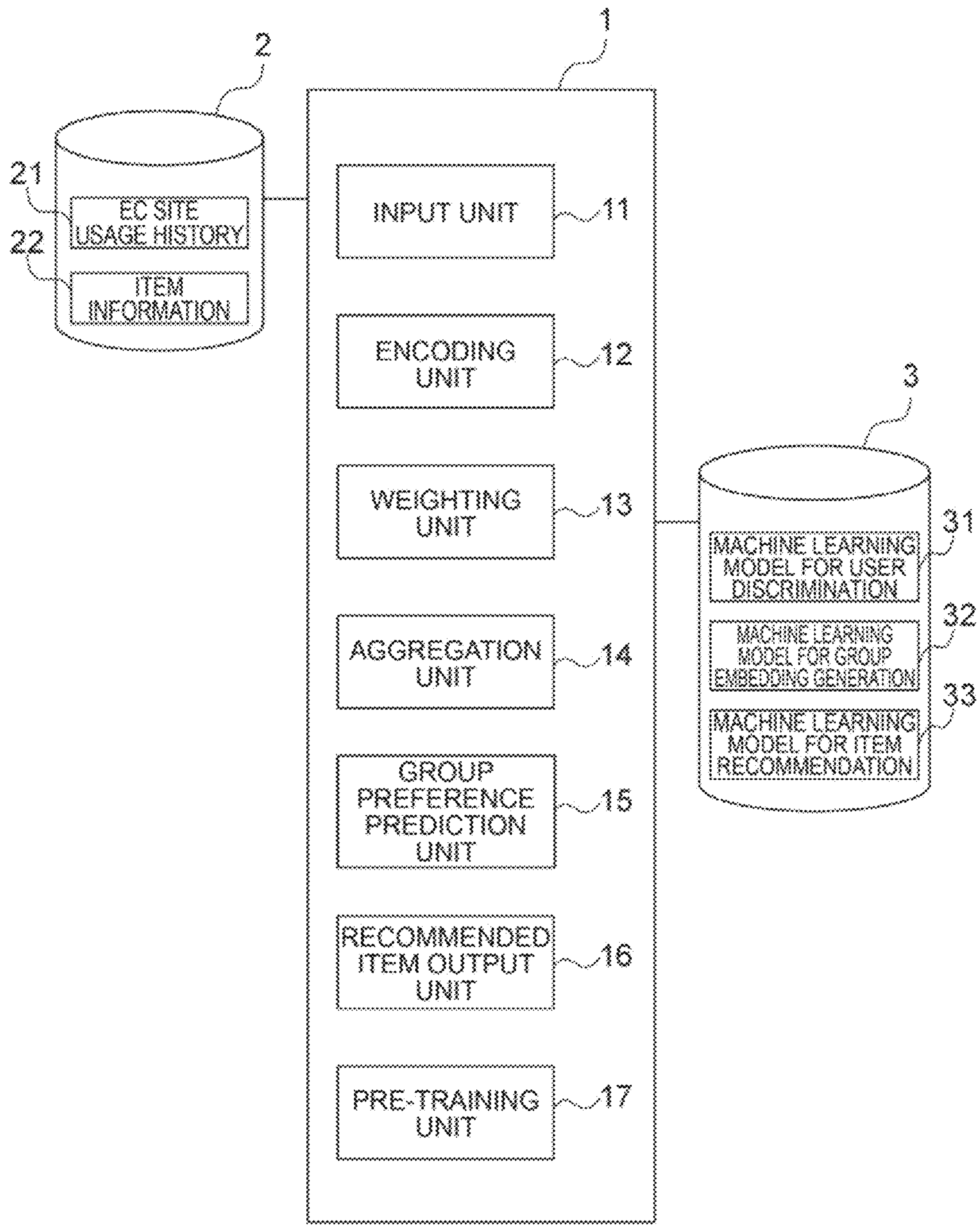
FIG. 1 is a block diagram illustrating an exemplary functional configuration of a group recommendation system according to respective embodiments of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

A group recommendation apparatus according to the present embodiment encodes a behavior history of a user for an item, extracts, for each of users, a preference of the user for the item, derives, for each of users, a weight indicating significance (i.e., criticality) of the user within a group of users (hereinafter also referred to as "user group") using information about the item, weights the extracted preference of the user with the derived weight, and aggregates weighted preferences to generate a preference of the user group to which the user belongs.

The group recommendation apparatus according to the present embodiment further uses the preference of the user group and corresponding information on the item to predict a score indicating the preference of the user group concerned for the item. The group recommendation apparatus according to the present embodiment may further uses the predicted preference of the user group for the item to predict an item or items to be recommended to the user group concerned and output the item(s) to be recommended.

Hereinafter, a certain non-limiting example will be described in which the group recommendation apparatus according to the present embodiment generates an embedding that is representative of a preference of a user (i.e., user preference) for an item from a purchase history and other operational histories of the user on an e-commerce site, or the like, where a product or service is available for purchase, as a behavior history of the user, aggregates multiple embeddings for multiple users belonging to the same user group, and generates an embedding that is representative of a preference of the user group (i.e., group preference) for the item.

However, the present embodiment is not limited thereto. For example, the group recommendation apparatus may derive the user preference based on other behavior histories, such as transaction histories at real stores or facilities instead of e-commerce sites. Also, the information that is representative of the user preference for an item is not limited to an embedding or embedding representation, but alternatively may be information in any format as long as such information is available to be fed to machine learning processing as features. Here, "preference" is broadly referred to as any information that can be ascertained through the user's behaviors associated with an item and that associates the user with the item. Also, "behavior history" is broadly referred to as any history of behaviors related to an item, such as purchase history of an item, setting history to a favorite item, click history of an item, and the like.

Furthermore, a user group may be a cluster of multiple users segmented based on any attribute of users that may be relevant to the purchase or other transactions of items, such as the users' age range, region of residence, income level, family structure, or analyzed persona. There is no limit to the number of users that can belong to a given user group, but in most cases a user group consists of a large number of users.

Yet furthermore, hereinafter a certain non-limiting example will be described in which the group recommendation apparatus generates a preference of a user group by aggregating multiple preferences of multiple users for an item, and also infers and outputs an item to be recommended to the user group based on the generated preference of the user group. However, the present embodiment is not limited thereto and may include another embodiment without inferring and outputting an item to be recommended to the user group.

According to the present embodiment, items may broadly include any goods or services that are subject to transactions with users.

Functional Configuration of Group Recommendation Apparatus

FIG. 1 is a block diagram illustrating an exemplary functional configuration of a group recommendation system. The group recommendation system shown in FIG. 1 is equipped with a group recommendation apparatus 1, a transaction information storage device 2, and a machine learning model storage device 3.

The group recommendation apparatus 1 includes an input unit 11, an encoding unit 12, a weighting unit 13, an aggregation unit 14, a group preference prediction unit 15, and a recommended item output unit 16. The group recommendation apparatus 1 may further include a pre-training unit 17, or alternatively, the pre-training unit 17 may be provided in other computing components other than the group recommendation apparatus 1.

The transaction information storage device 2 is a storage device that stores information associated with transactions between e-commerce sites and users, including an e-commerce site usage history 21 and item information 22.

The e-commerce site usage history 21 includes the history of items purchased or browsed by users through the e-commerce sites in the past, and attribute information of respective users who used the e-commerce sites. The item information 22 includes attribute information of items.

The machine learning model storage device 3 is a storage device that stores a machine learning model 31 for user discrimination, a machine learning model 32 for group embedding generation, and a machine learning model 33 for item recommendation. The machine learning model 31 for user discrimination, the machine learning model 32 for group embedding generation, and the machine learning model 33 for item recommendation may be machine learning models constituted separately and individually from each other. Alternatively, one may be incorporated into the other as a module, or those machine learning models may be pipelined together to constitute one or two machine learning models.

The transaction information storage device 2 and the machine learning model storage device 3 may each comprise a non-volatile storage device, such as a hard disk drive (HDD), solid state drive (SSD), and the like. The transaction information storage device 2 and the machine information model storage device 3 may suffice to be configured to be accessible from the group recommendation apparatus 1, and may be provided in other computing components.

The group recommendation apparatus 1 may be communicatively connected via a network to a client device (not shown) constituted with a PC (Personal Computer) or the like. In this case, the group recommendation apparatus 1 may be implemented in a server, and the client device may provide a user interface allowing the group recommendation apparatus 1 to input/output various information to/from external components. The client device may be equipped with some or all of the respective components 11 to 17 of the group recommendation apparatus 1.

The input unit 11 acquires the e-commerce site usage history 21 and the item information 22 stored in the transaction information storage device 2 as input data, and supplies the acquired e-commerce site usage history 21 and the item information 22 to the encoding unit 12 and the weighting unit 13.

Here, the e-commerce site usage history 21 may include information indicating or inferring a user's preference for an item, such as any behavior history including the history of operations performed by the user in relation to items on e-commerce sites, as well as attributes characterizing each user and information on a user group to which the user belongs, and the like. The item information 22 may include information indicating whether or not each user has purchased an item, various attributes characterizing the item such as the item's price, category, brand, and the like, and images of the item.

The input unit 11 extracts from the e-commerce site usage history 21 the behavior history for a target item of one or more users belonging to the same user group who have behavior histories for the target item for which the preference of the user group is to be predicted for the group recommendation processing, and supplies the extracted behavior history to the encoding unit 12 and the weighting unit 13 as the user behavior history information. The input unit 11 also extracts from the item information 22 item information of the target item for which the preference of the user group is to be predicted for the group recommendation processing, and supplies the extracted item information to the encoding unit 12 and the weighting unit 13.

The input unit 11 may acquire input data to be processed by reading the e-commerce site usage history 21 and the item information 22 stored in advance in the transaction information storage device 2, or alternatively, the input unit 11 may receive the e-commerce site usage history 21 and the item information 22 from the same or different counterpart device that stores the e-commerce site usage history 21 and the item information 22 via the communication interface (I/F). Yet alternatively, the input unit 11 may acquire and update the e-commerce site usage history 21 and the item information 22 in real time using web crawling or other methods via the communication I/F.

The input unit 11 also accepts input of various parameters necessary to perform the group recommendation processing in the group recommendation apparatus 1. The input unit 11 may accept input of various parameters via a user interface of the client device that is communicatively connected to the group recommendation apparatus 1.

The encoding unit 12 encodes the user behavior history information and the item information 22 supplied from the input section 11, respectively, and supplies the encoded user behavior history information and the encoded item information 22 to the weighting unit 13 and the aggregation unit 14, respectively.

More specifically, the encoding unit 12 converts the user behavior history information and the item information 22 into an embedding of the user behavior history information and an embedding of the item information 22, respectively. The encoding unit 12 generates the embeddings by converting respective components of the input data into multi-dimensional feature vector representations, which are mapped into a multi-dimensional vector space.

The encoding unit 12 generates an embedding of the user behavior history information for each of users, for one or more users who belong to a certain user group. The encoding unit 12 also generates an embedding of the item information of a target item that has an interaction with the user group concerned, in other words, that has a behavior history, such as a purchase history, of any of the users in the user group concerned. The embedding of the user behavior history information serves as an embedding indicating a preference of each of the users for the target item. It should be noted that, in the following, a certain example will be described in which the group recommendation apparatus 1 generates multiple embeddings for multiple users, respectively. However, when a user group includes only one user who has the behavior history for the target item, the group recommendation apparatus 1 may generate a single embedding for the user concerned. The same applies to the following processes performed by the weighting unit 13 and the aggregation unit 14, respectively.

According to the present embodiment, the e-commerce site usage history 21 input to the input unit 11 includes, as the behavior history of the target user, at least the purchase frequency with which the target user has purchased any of the multiple items offered on the target e-commerce site in the past, which is hereinafter referred to as "item purchase frequency". As such, the embedding of the user behavior history information generated by the encoding unit 12 includes features of the purchase frequency with which the target user has purchased one or more items on the e-commerce site in the past.

The item information 22 input to the input unit 11 includes at least information on the price of each item, and thus the embedding of the item information 22 generated by the encoding unit 12 includes features of the price of the target item.

Hereafter, the embedding of the above described user behavior history information is referred to as "user embedding" and the embedding of the item information is referred to as "item embedding", respectively. Those embeddings encode the nature or properties specific to the target entities to be processed, respectively. In other words, the user embedding encodes at least the behavior history for the target item that the user has taken in the past as the user's interaction with the target item. Likewise, the item embedding encodes various attributes related to the transaction with the item on the e-commerce sites.

The weighting unit 13 calculates weights with respect to the user embeddings of multiple users supplied from the encoding unit 12, each of which is calculated for each of users, assigns the calculated weights to user embeddings, respectively, and supplies the weighted user embeddings to the aggregation unit 14.

More specifically, using the machine learning model 31 for user discrimination, the weighting unit 13 inputs the user embedding and the corresponding item embedding supplied from the encoding unit 12 to the machine learning model 31 for user discrimination, and assigns a weight for each user, which is output from the machine learning model 3 for user discrimination, to the corresponding user embedding.

According to the present embodiment, the weight for each user calculated by the weighting unit 13 indicates the degree of influence of the user concerned on the purchase of the item within the user group concerned. In other words, a user to whom a greater weight is assigned contributes more significantly to the generation of the embedding of the user group output by the aggregation unit 14 in the latter stage, and thus has a more dominant and critical influence on the formation of the preference regarding the purchase of the item within the user group concerned as a whole.

The machine learning model 31 for user discrimination is a discriminator that discriminates each of users belonging to a user group, which is constituted with a neural network or an algorithm equipped with an attention mechanism. The attention mechanism is equipped with an encoder and a decoder, and calculates scores from the inner product of the KEY vectors of the encoder and the QUERY vectors of the decoder. According to the present embodiment, the machine learning model 31 for user discrimination uses the attention mechanism to generate an attention weight for each of users from the user embedding and the item embedding. The attention weight indicates the influence or criticality of each of multiple users in predicting the preference of the user group and, ultimately, in predicting an item to be recommended.

It should be noted that the weighting unit 13 may generate the attention weight using the machine learning model 31 for user discrimination, or alternatively, the weighting unit 13 itself may be constituted with the machine learning model 31 for user discrimination.

According to the present embodiment, the weighting unit 13 calculates the weight to be assigned to the user embedding for each of multiple users belonging to the same user group based on the correlation between the item purchase frequency of the user and the price of the item, from the user embedding including the item purchase frequency and the item embedding including the price of the item, the details of which will be described below with reference to FIGS. 5 and 6.

According to the present embodiment, the machine learning model 31 for user discrimination may be pre-trained using a pre-prepared training data set.

The aggregation unit 14 aggregates the weighted user embeddings of multiple users belonging to the same user group, which are supplied from the weighting unit 13, to generate an embedding of the preference that is representative of the user group concerned for the target item. The aggregated embedding for the user group is hereinafter referred to as "group embedding".

More specifically, the aggregation unit 14 calculates a weighted sum of the user embeddings of multiple users according to the weights assigned to respective users belonging to the same user group, and aggregates the user embeddings into a single group embedding that is representative of the user group concerned. It should be noted that, instead of the weighted sum, the aggregation unit 14 may apply a predetermined aggregation function to the multiple user embeddings to aggregate the user embeddings into a single group embedding.

In general, there is a certain method of deriving a preference of a user group by directly deriving the preference from the past interactions of the user group with the target item and assuming the directly derived preference as a preference of a virtual user. However, in the case of a user group on the e-commerce sites, there are almost no interactions of the user group itself with the target item because there is no unified behavior of the user group. This results in a situation where the data of interactions between the user group and the target item to be input into the machine learning model is extremely sparse and ineffective. In contrast, according to the present embodiment, the preference of the user group for the target item is derived indirectly by aggregating the past interactions with the target item of respective users belonging to the same user group.

Furthermore, according to the present embodiment, the aggregation unit 14 aggregates multiple user embeddings into a single group embedding that shares the same vector space (i.e., embedding space) with the user embeddings, using a feature learning method that uses the attention weights learned by the machine learning model 31 for user discrimination to learn feature representations of the preference that is representative of the user group for the item.

The group preference prediction unit 15 predicts the preference of the user group concerned for the target item from the group embedding aggregated by the aggregation unit 14, the corresponding item embedding, and another group embedding specific to the user group concerned.

More specifically, the group preference prediction unit 15 concatenates the group embedding to the corresponding item embedding, propagates the concatenated group-item embedding in a neural network constituted with multiple layers, and predicts a score of the target item in the target user group. This score is a score that quantitatively indicates the degree of preference of the target user group for the target item, and is supplied to the recommended item output unit 16 at a later stage.

The recommended item output unit 16 outputs one or more items to be recommended to the user group concerned based on the score of the user group for the item supplied from the group preference prediction unit 15.

More specifically, the recommended item output unit 16 may output a certain item as a recommended item when the score of the user group concerned for the item, which is supplied from the group preference prediction unit 15, is equal to or greater than a predetermined preference threshold that has been pre-set or learned beforehand.

Alternatively, the recommended item output unit 16 may retain multiple scores for multiple items for the user group concerned, sort the retained multiple items in the order of scores, and output sorted items as a list of recommended items.

The recommended item may be output to a display device or other device in a manner browsable by users.

The pre-training unit 17 pre-trains machine learning model 31 for user discrimination. When the group recommendation apparatus 1 according to the present embodiment is implemented in one or more machine learning models, the pre-learning unit 17 may pre-train respective machine learning models. Those machine learning models are machine learning models having different structures from each other and are pre-trained using different training data sets, respectively, the details of which will be described below with reference to FIG. 9.

However, it should be noted that the machine learning models that may be used for the group recommendation processing according to the present embodiment are not limited to supervised machine learning models, and unsupervised machine learning models using, for example, the reinforcement learning may be used.

Figure 2:
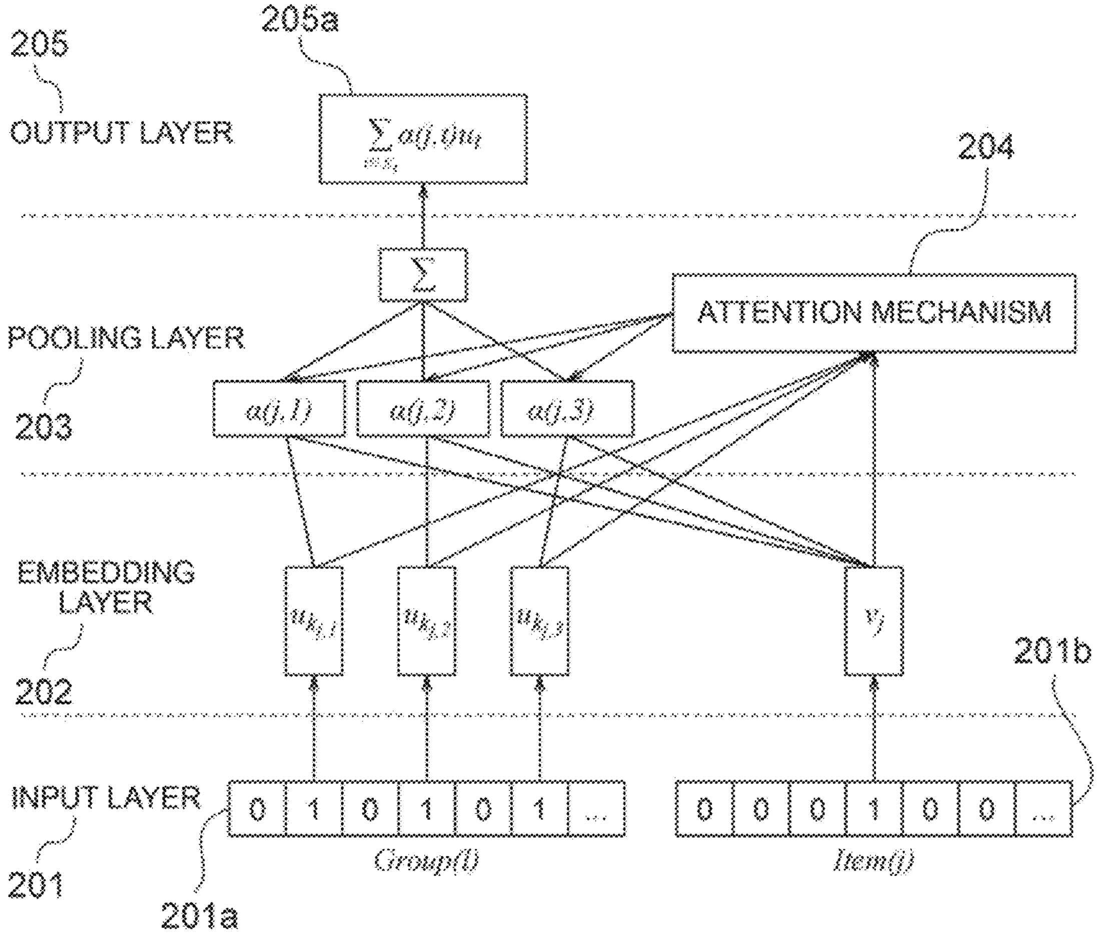
FIG. 2 is a schematic diagram illustrating an example in which a function to derive the preference of the user group at the front end of the group recommendation is implemented in a first neural network equipped with an attention mechanism.

Network Configuration of Group Embedding Generation Processing and Item Recommendation Processing FIG. 2 is a schematic diagram illustrating an example in which the functions to generate the group embedding, which are performed by the input unit 11, the encoding unit 12, the weighting unit 13, and the aggregation unit 14 in the front end of the group recommendation apparatus 1, are implemented in a first network.

Figure 3:
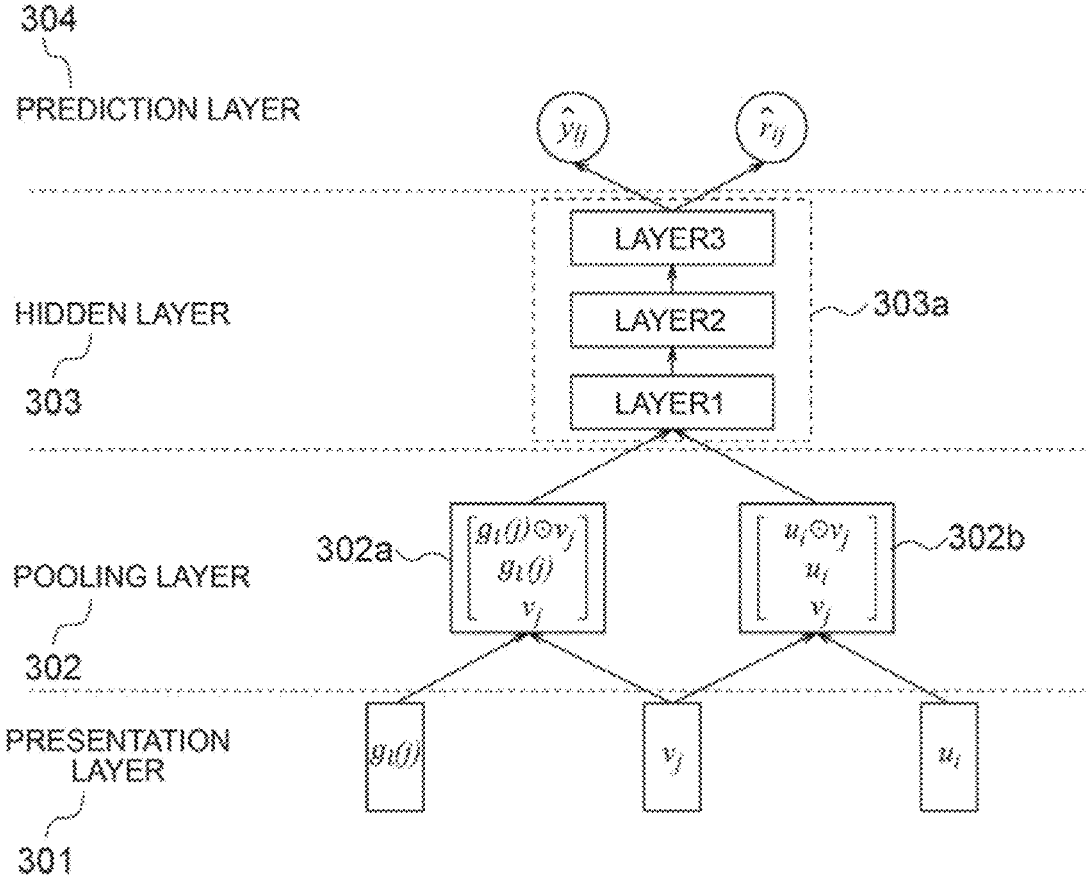
FIG. 3 is a schematic diagram illustrating an example in which a function to recommend items to a group of users at the back end of the group recommendation is implemented in a second neural network.

FIG. 3 is a schematic diagram illustrating an example in which the functions to recommend items, which are performed by the group preference prediction unit 15 and the recommended item output unit 16 in the back end of the group recommendation apparatus 1, are implemented in a second network.

Referring to FIG. 2, the first network is provided with a neural network that includes an input layer 201, an embedding layer 202, a pooling layer 203, an attention mechanism 204, and an output layer 205.

The first network is a representation learning model that learns, from multiple user embeddings allocated in the vector space, a single group embedding that it to be mapped to the same vector space, and has a neural network structure.

An index list 201*a* of users belonging to a certain user group and an index list 201*b* of items are input to the input layer 201 of the first network. As the index list 201*a* of users, all the users belonging to the same user group may be input to the input layer 201. Alternatively, among all users belonging to the same user group, users who have interactions with the target item based on their past behavior history may be input to the input layer 201.

The user behavior history information of users input to the input layer 201 includes the behavior history of the target user for the target item and various attributes of the target user as information that indicates or infers the past preferences for the item with which the target user interacts.

In FIG. 2, as the index list 201*b* of the item, one item from the list of related multiple items is also input to the input layer 201 as the target item from which the preference of the user group is to be inferred.

The item information of the item input to the input layer 201 includes at least information on whether or not the item concerned was purchased by any user in the user group concerned, various attributes of the item, and an image of the item. The attributes of the item include at least the price of the item concerned.

The list of users 201*a* and the list of items 201*b* input to the input layer 201 are encoded in the embedding layer 202 of the first network and transformed into the user embedding $u_{kj,1}$, $u_{kj,2}$, $u_{kj,3}$ for respective users and the item embedding $v_j$ for each item and allocated in the vector space, respectively.

The user embeddings $u_{kj,1}$, $u_{kj,2}$, and $u_{kj,3}$ generated in the embedding layer 202 are weighted with the attention weights in the pooling layer 203 of the first network by the attentional mechanism 204, which is a neural attentional mechanism, and are converted to weighted user embeddings with weights: α(j, 1), α(j,2), α(j, 3).

More specifically, the attention mechanism 24 uses the item embedding $v_j$ to derive the attention weights α(j, 1), α(j,2), and α(j,3) for the user embeddings $u_{kj,1}$, $u_{kj,2}$, $u_{kj,3}$ of respective users, respectively. Each of those attention weights discriminates each of users within the user group l and serves as an indicator of the influence or criticality on the decision making of the user group to purchase the target item j by respective users. Each of those attention weights may be different from each other for each of users depending on the past preferences indicated by the behavior history of respective users and the attributes of the target item. The attention mechanism 24 also weights user embeddings $u_{kj,1}$, $u_{kj,2}$, and $u_{kj,3}$, of respective users with the derived attention weights α(j, 1), α(j,2), and α(j,3) to convert into weighted user embeddings of respective users, respectively.

Those weights α(j, 1), α(j,2), and α(j,3) are parameters α(j,t) that can be learned by the attention mechanism 204 using the user embeddings $u_{kj,1}$, $u_{kj,2}$, $u_{kj,3}$ and the item embedding vj as inputs in the machine learning model 32 for group embedding generation. According to the present embodiment, the machine learning model 31 for user discrimination performs the function of the attention mechanism 204 in FIG. 2, the details of which will be described below with reference to FIG. 6.

In the pooling layer 203, the weighted user embeddings of multiple users are further aggregated to generate a group embedding 205*a* that is representative of the user group concerned, which is output externally via the output layer 205.

It should be noted that the user group itself may or may not have an interaction with the item j. When the user group has the interaction with the item j, the embedding indicating the user group's own preference for the item may be directly generated. Thus, the directly generated embedding of the user group may be added to the group embedding 205*a*, which is obtained by aggregating the user embeddings of multiple users. For example, when at least two users in the user group have interactions with the target item, it may be assumed that the user group has interactions with the target item.

Referring to FIG. 3, the second network is equipped with a neural network that includes a representation layer 301, a pooling layer 302, a hidden layer 303, and a prediction layer 304.

The second network is a learning model that learns the interactions between user groups and items from the group embedding $g_l(j)$, which indicates the preference of the user group l for the target item j output from the first network, and the item embedding $v_j$ of the item j to predict the score $\hat{}_{lj}$ of the item j for the user group l. For example, the second network may have a multi-layer neural network structure such as Neural Collaborative Filtering (NCF).

It should be noted that the first and second networks may be implemented in a single machine learning model, or both networks may be pipelined together.

The group embedding $g_l(j)$ indicating the preference for the item j and the item embedding $v_j$ of the target item j are input to the representation layer 301 of the second network in FIG. 3.

The pooling layer 302 of the second network calculates the element-by-element product of the group embedding $g_l(j)$ and the item embedding $v_j$ of the item j. In this pooling layer 302, a group-item concatenated embedding 302*a* is generated by concatenating the calculated product, the group embedding $g_l(j)$ and the item embedding $v_j$ of the target item j. The group-item concatenated embedding 302*a* is a vector representation that models the interaction between the group embedding $g_l(j)$ and the item embedding $v_j$ of the target item j.

The group-item concatenated embedding 302*a* generated in the pooling layer 302 is propagated in the hidden layer 303 of the second network to the multiple layers 303*a* constituting the hidden layer 303.

The prediction layer 304 of the second network outputs the score $\hat{}y_{lj}$ output from the hidden layer 303 as a prediction value indicating the degree of willingness or preference of the user group l to purchase the item j.

Furthermore, the second network shown in FIG. 3 may predict the preference for the item j for each of users.

Referring to FIG. 3, as in the case of user groups, a user embedding $u_i$ indicating the preference of a user for the item j and the item embedding $v_j$ of the target item j is input to the representation layer 301 of the second network.

The pooling layer 302 of the second network calculates the element-by-element product of the user embedding $u_i$ and the item embedding $v_j$ of the target item j. In the pooling layer 302, a user-item concatenated embedding 302*b* is generated by concatenating the calculated product, the user embedding $u_i$, and the item embedding $v_j$ of the target item j. The user-item concatenated embedding 302*b* is a vector representation that models the interaction between the user embedding $u_i$ and the item embedding $v_j$ of the target item j.

The user-item concatenated embedding 32*b* generated in the pooling layer 302 is propagated in the hidden layer 303 of the second network to the multiple layers 303*a* constituting the hidden layer 303. The multiple hidden layers 303 may be shared for calculating the score $\hat{}y_{lj}$, which predicts the preference of the user group l for the target item j.

The prediction layer 304 of the second network outputs the score $\hat{}r_{ij}$ output from the hidden layer 303 as a prediction value indicating the degree of willingness or preference of each of users to purchase for the target item j.

It should be noted that the second network may be configured not to calculate the score $\hat{}r_{ij}$ for the target item j for each of users. In this case, the user embedding $u_i$ for each of users may not be input to the representation layer 301 of the second network.

Group Recommendation Processing Performed by Group Recommendation Apparatus 1

Figure 4:
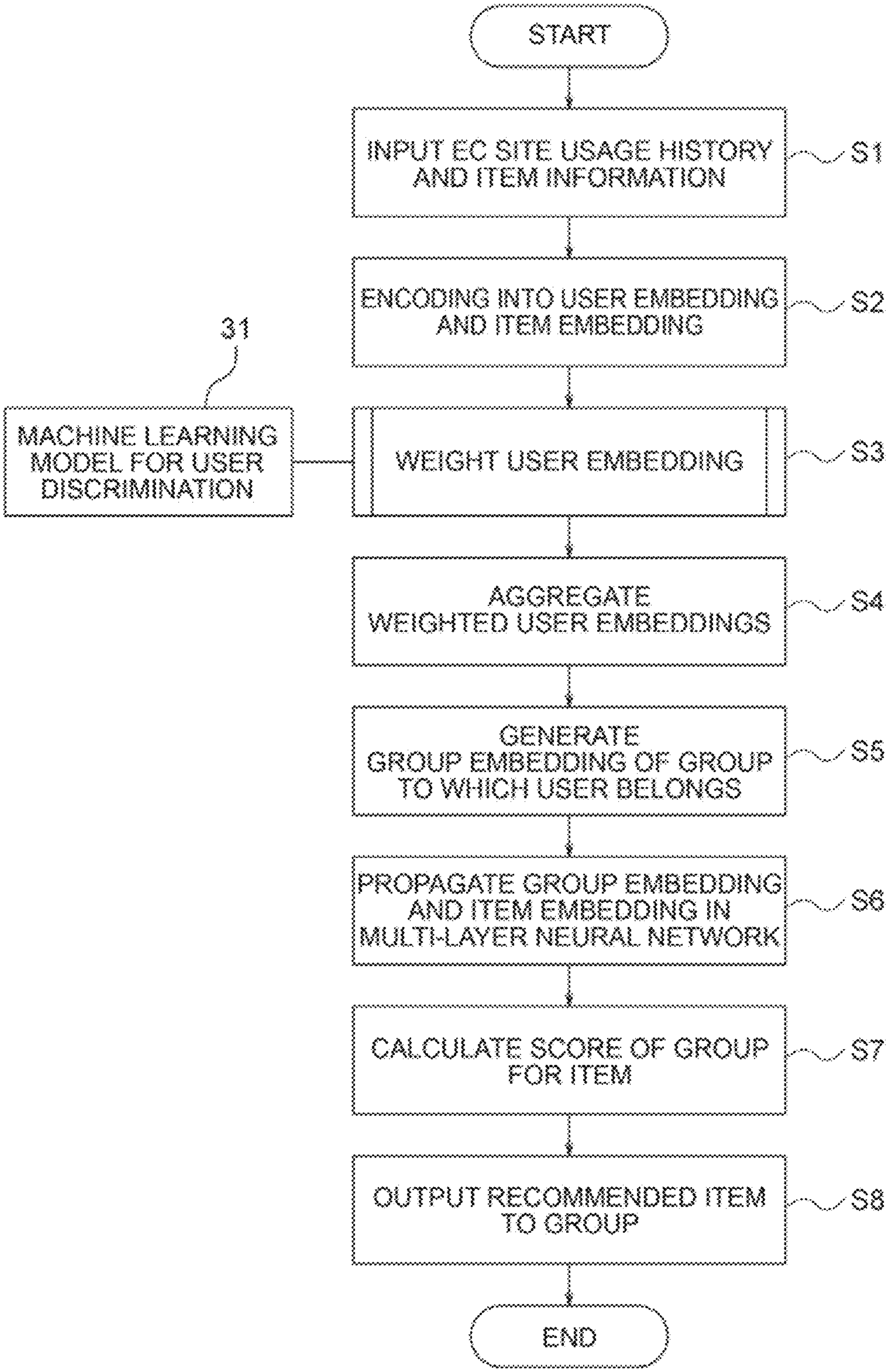
FIG. 4 is a flowchart illustrating an exemplary outline processing procedure of the group recommendation processing performed by the group recommendation apparatus 1 according to the present embodiment.

FIG. 4 is a flowchart illustrating an exemplary outline processing procedure of the group recommendation processing performed by the group recommendation apparatus 1 according to the present embodiment. The group recommendation processing shown in FIG. 4 corresponds to the inference phase in which the group recommendation apparatus 1 predicts the preference of a user group using the machine learning model 31 for user discrimination, the machine learning model 4 for group embedding generation, and the machine learning model 33 for item recommendation.

It should be noted that each step shown in FIG. 4 may be performed by the CPU reading and executing a program stored in the storage device such as an HDD of the group recommendation apparatus 1. Alternatively, at least a part of the flowchart shown in FIG. 4 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the input unit 11 of the group recommendation apparatus 1 acquires the e-commerce site usage history 21 and the item information 22 for one or more users belonging to the same user group from the transaction information storage device 2 and supplies the acquired information to the encoding unit 12 and weighting unit 13.

Here, the e-commerce site usage history 21 is information for deriving the user's past preferences for items, and may include any behavior history, including any operations performed by the user in relation to items on the e-commerce sites, and attributes characterizing each of users, information about the user group to which the user belongs, and the like. The item information 22 may include information indicating whether or not each user has purchased the item, various attributes characterizing the item, images of the item, and the like.

According to the present embodiment, the group recommendation apparatus 1 uses the information on the purchase frequency of items on the target e-commerce site, which is included in the behavior history of users in the e-commerce site usage history 21, and the price of the target item to derive the attention weight to be assigned to the target user. For this purpose, the e-commerce site usage history 21 input to the input unit 11 in step S1 includes at least the purchase frequency of the target item and other items on the e-commerce site by the user. Also, the item information 22 input to the input unit 11 in step S1 includes at least information on the price of the target item.

In step S2, the encoding unit 12 of the group recommendation apparatus 1 encodes the e-commerce site usage history 21, which is supplied from the input unit 11 in step S1, and maps the encoded e-commerce site usage history to the vector space to transform the mapped information to the user embeddings $u_{kj,1}$, $u_{kj,2}$, $u_{kj,3}$. Similarly, the encoding unit 12 encodes the item information 22, which is supplied from the input unit 11 in step S1, and maps the encoded item information to the vector space to transform the mapped information into the item embedding $v_j$.

According to the present embodiment, the user embeddings $u_{kj,1}$, $u_{kj,2}$, and $u_{kj,3}$ obtained in step S2 includes the above described item purchase frequency, and the item embedding $v_j$ obtained in step S2 includes at least information on the price of the target item.

In step S3, the weighting unit 13 of the group recommendation apparatus 1 inputs the user embeddings $u_{kj,1}$, $u_{kj,2}$, $u_{kj,3}$ and item embedding $v_j$, which are generated by the encoding unit 12 in step S2, to the machine learning model 31 for user discrimination, and causes the machine learning model 31 for user discrimination to drive the attention weights for respective users. The weighting unit 13 also weights the user embedding $u_{kj,1}$, $u_{kj,2}$, $u_{kj,3}$ with the corresponding attention weights, which are output from the machine learning model 31 for user discrimination, to convert into the weighted user embeddings, respectively.

Details of the weighting processing to be performed using the machine learning model 31 for user discrimination will be described below with reference to FIG. 5. The machine learning model 31 for user discrimination may be a machine learning model equipped with a pre-trained neural attention mechanism, and the details of the pre-training will be described below with reference to FIG. 9.

In step S4, the aggregation unit 14 of the group recommendation apparatus 1 aggregates multiple weighted user embeddings for multiple users, which are generated by the weighting unit 13 in step S3.

In step S5, the aggregation unit 14 of the group recommendation apparatus 1 also generates the group embedding $g_l(j)$ as a result of aggregating multiple weighted user embeddings. The group embedding $g_l(j)$ generated in step S5 serves as a group embedding that is representative of the preference of the user group to which the target user belongs.

It should be noted that steps S1 through S5 may be performed by the group recommendation apparatus 1 using the machine learning model 32 for group embedding generation and the machine learning model 31 for user discrimination, or by implementing those machine learning models 31 and 32 therein. Alternatively, the machine learning model 31 for user discrimination may be incorporated as a module into the machine learning model 32 for group embedding generation.

Here, machine learning models broadly include networks, algorithms, modules, and the like, of which parameters can be learned by machine learning.

In step S6, the group preference prediction unit 15 of the group recommendation apparatus 1 propagates the group embedding $g_l(j)$ of the user group and the item embedding $v_j$ of the target item, which are generated in step S5, in a multi-layer network, such as the Multi-Layer Perceptron (MLP).

In step S7, the group preference prediction unit 15 of the group recommendation apparatus 1 predicts the score of the target user group for the target item, as a result of propagating the group embedding $g_l(j)$ of the target user group and the item embedding $v_j$ of the target item in the multi-layer network.

The group preference prediction unit 15 may input the group embedding $g_l(j)$ of the target user group and the item embedding $v_j$ of the target item, which are output from the machine learning model 32 for group embedding generation, as the group embedding $g_l(j)$ and the item embedding $v_j$ to be input to the machine learning model 33 for item recommendation, and causes the machine learning model 33 for item recommendation to predict the score of the target user group for the target item.

The score predicted in step S6 serves as an indicator quantitatively indicating the likelihood that the recommendation of the target item to the target user group will result in the purchase of the target item. In other words, the higher the score predicted in step S6 is, the more likely the item is to have a higher advertising effect when recommended.

The group recommendation apparatus 1 may repeat the processing from steps S1 to S7 multiple times until respective scores are obtained for the desired items.

In step S8, the recommended item output unit 16 of the group recommendation apparatus 1 determines, based on the score of the target item output by the group preference prediction unit 15, the item for which a score higher than a predetermined threshold or a learnable threshold is calculated as an item to be recommended, and outputs the recommended item or a list of multiple items to be recommended to a device such as a display device of users belonging to the target user group.

Detailed Processing Procedure of Weighting Processing to User Embeddings

Figure 5:
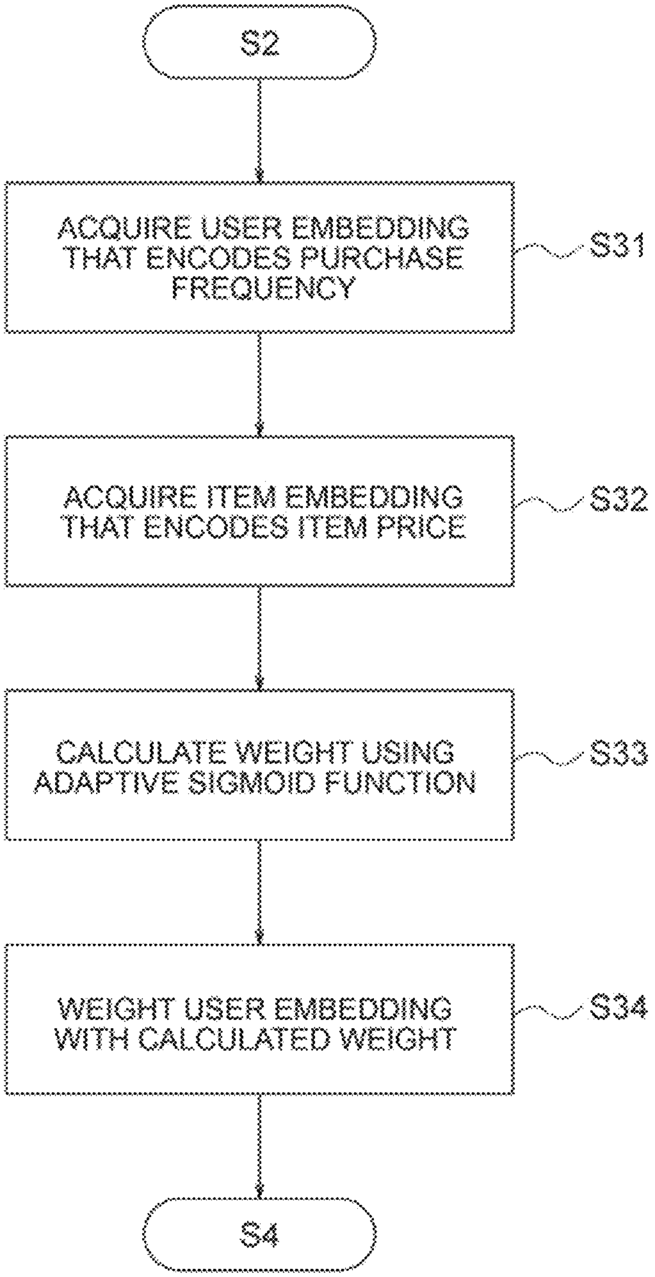
FIG. 5 is a flowchart illustrating an exemplary detailed processing procedure of the weighting processing in step S3 in FIG. 4, which is performed by the group recommendation apparatus according to the present embodiment.

FIG. 5 is a flowchart illustrating an exemplary detailed processing procedure of the weighting processing in step S3 of FIG. 4, which is performed by the group recommendation apparatus 1.

After the user embeddings $u_{kj,1}$, $u_{kj,2}$, $u_{kj,3}$ of users belonging to the target user group and the item embedding $v_j$ of the target item are generated in step S2 of FIG. 4, in step S31 of FIG. 5, the weighting unit 13 of the group recommendation apparatus 1 acquires from the encoding unit 12 the encoded user embeddings $u_{kj,1}$, $u_{kj,2}$, and $u_{kj,3}$. According to the present embodiment, the user embeddings $u_{kj,1}$, $u_{kj,2}$, $u_{kj,3}$ acquired by the weighting unit 13 in step S31 include at least features encoding the above described item purchase frequency, respectively.

In step S32, the weighting unit 13 of the group recommendation apparatus 1 acquires the encoded item embedding $v_j$ from the encoding unit 12. According to the present embodiment, the item embedding $v_j$ acquired by the weighting unit 13 in step S32 includes at least features encoding the price of the target item.

According to the present embodiment, the attention weight for each of users is derived depending on the correlation between the price of the target item and the above described item purchase frequency. As described above, the item purchase frequency refers to the frequency with which a user has purchased items in the past on the e-commerce site (or e-commerce platform) subject to prediction, and includes the number of times the user has purchased not only the target item but also multiple items, including other items available for purchase on the e-commerce site concerned. However, when there is a large number of past interactions between the target item to be predicted and the user or the user group, in other words, a number of times the target item has been purchased in the past, the purchase frequency to be considered for deriving the attention weight may be narrowed down to only the purchase frequency of the target item and items similar to the target item among all items available for purchase on the e-commerce site concerned.

A user who purchases items more frequently than other users in a user group (i.e., frequent buyers) is considered to be a critical user who is more influential on the decision to purchase items in the user group. However, the present inventors have found that this tendency varies depending on the price of respective items.

Here, a user with a high item purchase frequency (i.e., frequent buyer) may be determined relative to the item purchase frequency of other users in the user group. For example, a user with the item purchase frequency that is twice or more than the average item purchase frequency of other users in the same user group may be determined as the user with a high item purchase frequency (i.e., frequent buyer). Alternatively, a threshold value for the minimum number of past purchases on the e-commerce site to be predicted may be pre-set, and users with the item purchase frequency exceeding the pre-set threshold value may be determined as the user with a high item purchase frequency (i.t., frequent buyer).

More specifically, the present inventors have found that when the price of the target item is relatively low, the user with the high item purchase frequency is highly likely to be a critical user (i.e., influential user) having higher influence on the decision to purchase the target item within the user group, while when the price of the target item is relatively high, the user with the high item purchase frequency will lose influence on the decision to purchase the target item within the user group. According to the present embodiment, the attention weight of each of users is derived based on the above findings. Those findings have been newly found and verified by the present inventors by analyzing the users who had the most influence on the result of recommending items to the user group.

Based on the above findings, the group recommendation apparatus 1 according to the present embodiment causes the machine learning model 31 for user discrimination to learn to model the processing to derive the user's attention weight from the price of the item and the frequency of interaction, such as the frequency of purchase, of the user with items. More specifically, the machine learning model 31 for user discrimination is a machine learning model trained such that when the price of an item is low, a greater weight is given to users who purchase the item more frequently than when the price of the item is high.

In order to infer the preference of the user group for items using the machine learning model 31 for user discrimination trained in this way, when the price of the target item is relatively low, the group recommendation apparatus 1 evaluates a user with high item purchase frequency as a more critical (i.e., influential) user, and derives a greater attention weight such that the preference of the user will more dominantly influence on inferring the preference of the user group for the item. On the other hand, when the price of the target item is relatively high, the group recommendation apparatus 1 derives a smaller attention weight such that the influence of the preference of the user with high item purchase frequency will be diminished on inferring the preference of the user group for the item.

By applying the machine learning model 31 for user discrimination configured in this way, according to the present embodiment, it makes it possible to selectively determine the critical users based on the attributes of items, rather than simply selecting popular items as a to-be-recommended item, so as to improve accuracy in inferring the preference of the user group and recommending items. In addition, the present embodiment eliminates the necessity to train the machine learning model 31 for user discrimination using user information of non-member users who do not belong to the target user group contrastively with respect to user information of member users who belong to the target user group. As a result, it makes it possible to perform inference of the preferences of user groups and item recommendations with higher accuracy without preparing a large training data set.

Referring back to FIG. 5, in step S33, the weighting unit 13 of the group recommendation apparatus 1 inputs the user embeddings $u_{kj,1}$, $u_{kj,2}$, $u_{kj,3}$ acquired in step S31 and the item embedding $v_j$ acquired in step S32 into the machine learning model 31 for user discrimination, and causes the machine learning model 31 for user discrimination to derive the attention weight to be assigned to the user embedding of the target use.

According to the present embodiment, the machine learning model 31 for user discrimination may derive the attention weights using, for example, the adaptive sigmoid function (σ) shown in Equation 1 below.

$$w_{to} = \frac{1}{1 + e^{-\alpha_o p_t}} \quad \text{(Equation 1)}$$

where $W_{to}$ denotes the attention weight of a user t within the user group for item o, $\alpha_o$ denotes the inverse proportion to the price of item o, and $p_t$ denotes the proportion to the purchase frequency of user t. 1 may be an arbitrary scalar.

Figure 6:
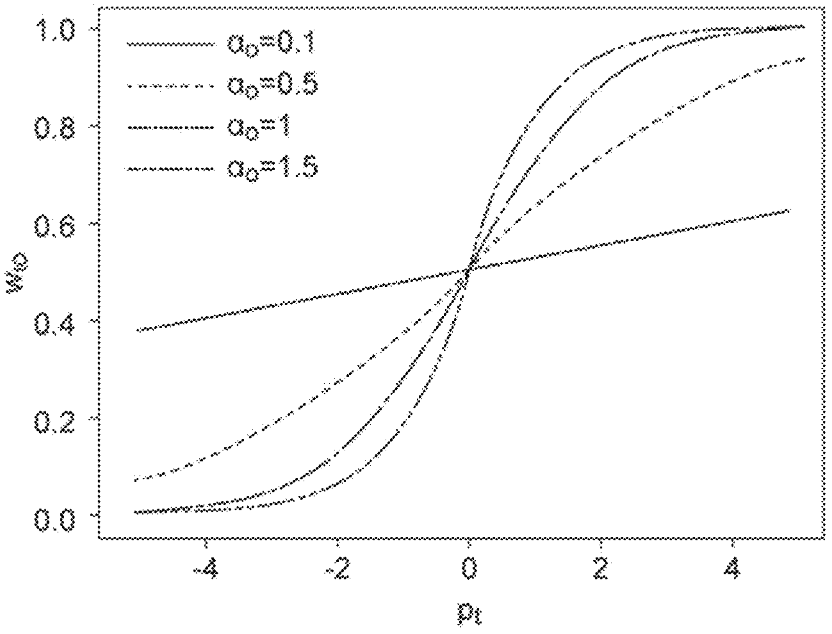
FIG. 6 is a conceptual diagram illustrating an exemplary relationship among the input item price, the user's item purchase frequency, and the output weights in the adaptive sigmoid function implemented in the machine learning model 31 for user discrimination.

FIG. 6 is a schematic diagram illustrating an example in which different values are substituted to the variable of the price of the item o in the adaptive sigmoid function in Equation 1, respectively, to derive the corresponding attention weights $W_{to}$. The machine learning model 31 for user discrimination models the relationship between the item price, the user's interaction with the item (as indicated, for example, by the item purchase frequency), and the attention weight to the user as shown in FIG. 6.

Here, information of the item purchase frequency may be normalized to a value between 0 and 5, for example. Also, information of the price may include normal a price, sale price, whether the item is on sale, and price class, and the like. The price information may be normalized to a value between 0.01 and 1, for example.

In FIG. 6, the corresponding attention weights $W_{to}$ are plotted as solid, dashed, single dotted, and double dotted lines, respectively, when the inversely proportional value $\alpha_o$ to the price of item o is 0.1, 0.5, 1, and 1.5, respectively. As $\alpha_o$ is inversely proportional to the item o, the price of the item o is the highest when $\alpha_o$=0.1, shown by the solid line, and the price of the item o is the lowest when $\alpha_o$=1.5, shown by the double dotted line.

As apparent from FIG. 6, when the price of the item o is the highest at $\alpha_o$=0.1, the value of the attention weight $W_{to}$, indicated by the solid line, does not change significantly, although the attention weight $W_{to}$ increases slightly in a linear manner as the purchase frequency of the item o by user t increases. On the other hand, when the price of the item o is the lowest at $\alpha_o$=1.5, the value of the attention weight $W_{to}$, indicated by the double dotted line, is lower when the user t purchases the item o less frequently and increases significantly to a higher value as the frequency of purchase increases.

In other words, as the price of the item o decreases, $\alpha_o$ increases, and the output $W_{to}$ of the sigmoid function in Equation 1 demonstrates a steep slope. This means that users with high item purchase frequency (i.e., frequent buyers) have significantly higher attention as compared to users with low item purchase frequency. On the other hand, when the price of the item o is high, $\alpha_o$ decreases, and the output $W_{to}$ of the sigmoid function in Equation 1 demonstrate a slight slope. This means that the difference between users with high item purchase frequency (i.e., frequent buyers) and users with low item purchase frequency (i.e., non-frequent buyers) will be smaller.

As such, the sigmoid function is adapted such that, for items with relatively low prices, the value of the attention weight $W_{to}$ follows the change in the user's item purchase frequency and thus changes more significantly than for items with relatively high prices.

It should be noted that the adaptive sigmoid function shown in Equation 1 is no more than an example, and a function that can be implemented in the machine learning model 31 for user discrimination is not limited thereto. For example, other activation functions, such as a softmax function, for example, may be implemented as long as those functions can model the relationship between the price of the item, the interaction between the user and the item (as indicated, for example, by the frequency of purchase), and the attention weight assigned to the user.

According to the present embodiment, the above described adaptive sigmoid function is implemented in the machine learning model 31 for user discrimination, which is a neural attention mechanism, to dynamically derive the attention weight to be assigned to the user embedding for each of users in a user group. This attention weight may be tuned by pre-training the machine learning model 31 for user discrimination to learn the relationship between the price of the item, the frequency of user interactions with the item, and the attention weight that is to be assigned to the user within the user group. The pre-training unit 17 causes the machine learning model 31 for user discrimination to learn the attention weights that indicate the influence or criticality of respective users in the decision to purchase the target item within the user group.

By using the machine learning model 31 for user discrimination configured above, the group recommendation apparatus 1 according to the present embodiment is able to derive the attention weights with high accuracy, with a simple configuration and lower load.

Figure 7:
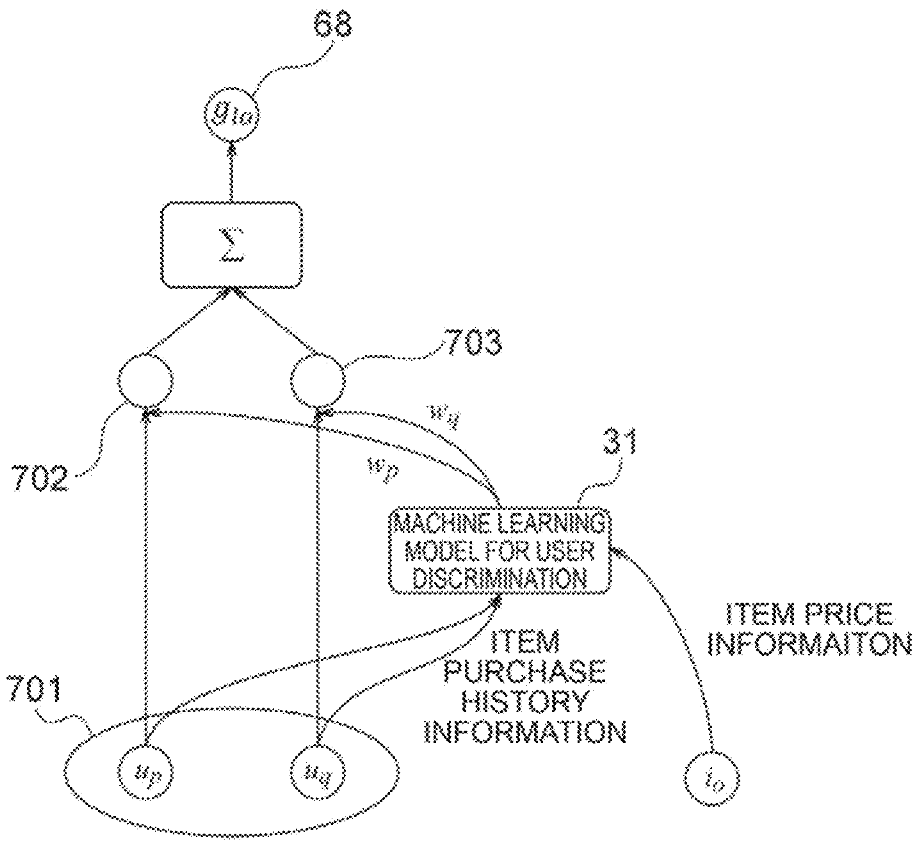
FIG. 7 is a schematic diagram illustrating an exemplary processing procedure of the processing to derive the preference of a group of users using the machine learning model 31 for user discrimination and a machine learning model 32 for group embedding generation, which is performed by the group recommendation apparatus 1 according to the present embodiment.

Processing Procedure Using Machine Learning Model 32 for Group Embedding Generation and Machine Learning Model 33 for Item Recommendation FIG. 7 is a schematic diagram illustrating an exemplary processing procedure when the processing to derive the preference of a user group performed by the group recommendation apparatus 1 is implemented in the machine learning model 32 for group embedding generation.

Figure 8:
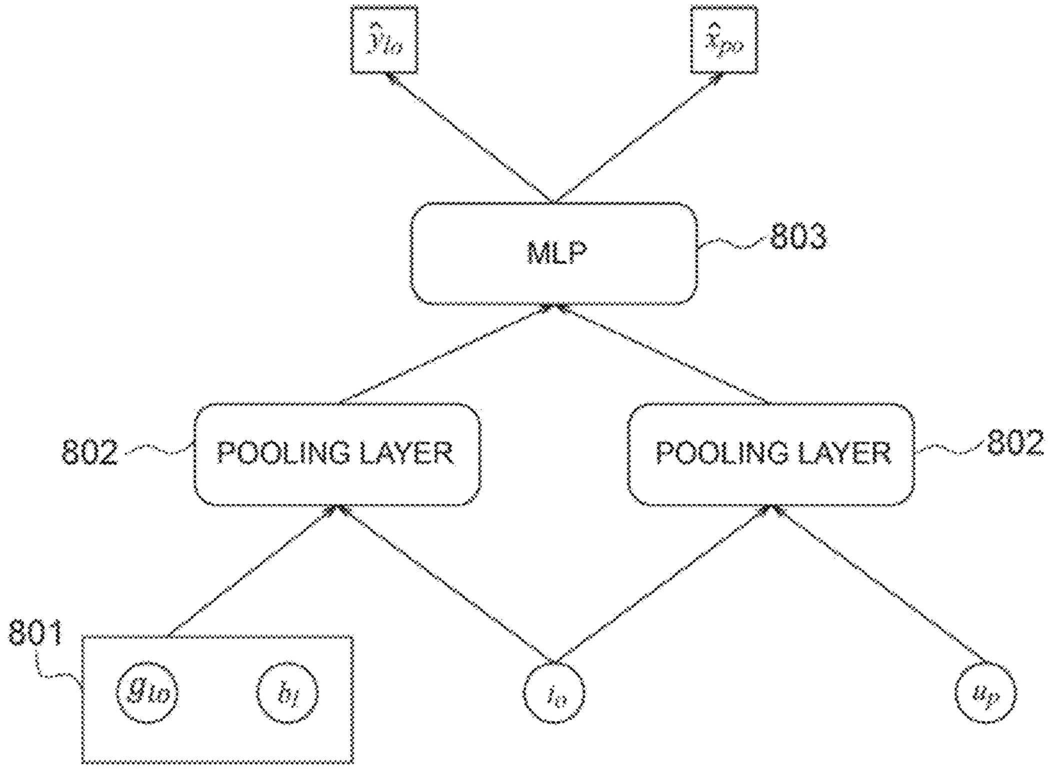
FIG. 8 is a schematic diagram illustrating an exemplary processing procedure of the processing to recommend items to a group of users using the machine learning model 33 for item recommendation, which is performed by the group recommendation apparatus 1 according to the present embodiment.

FIG. 8 is a schematic diagram illustrating an exemplary processing procedure when the processing to recommend items to a user group performed by the group recommendation apparatus 1 is implemented in the machine learning model 33 for item recommendation.

The basic network configuration of the machine learning model 32 for group embedding generation is the same as the first network configuration shown in FIG. 2. Likewise, the basic network configuration of the machine learning model 33 for item recommendation is the same as the second network configuration shown in FIG. 3. However, in FIG. 7, the neural attention mechanism 204 in FIG. 2 is replaced with the machine learning model 31 for user discrimination.

Referring to FIG. 7, the user behavior history information of multiple users belonging to the same user group 701 is input to the machine learning model 32 for group embedding generation. The input user behavior history information is encoded into the user embedding up and $u_q$ for each of users in the embedding layer 202 of the machine learning model 32 for group embedding generation.

Also, the item information 22 of the target item, which is the target for which the preference of the user group is inferred, is input to the machine learning model 32 for group embedding generation. The input item information 22 includes at least an identifier of the item from which information on the price of the target item can be derived. Such item information 22 may be encoded in the item embedding $i_o$ in the embedding layer 202 of the machine learning model 32 for the group embedding generation.

The user embeddings $u_p$, $u_q$ and the item embedding $i_o$ are input to the machine learning model 31 for user discrimination, which operates as a neural attention mechanism. Here, the user embeddings $u_p$ and $u_q$ encode the purchase histories of items on the e-commerce sites for the respective users p and q, respectively. In addition, the item embedding $i_o$ encodes information on the price of the target item o.

The machine learning model 31 for user discrimination implements the adaptive sigmoid function ($\sigma$) in Equation 1 described above and applies the adaptive sigmoid function ($\sigma$) to the user embeddings $u_p$, $u_q$ and the item embedding $i_o$ to derive the attention weights $W_p$ and $W_q$ corresponding to the respective users p and q, respectively.

The attention weights $W_p$ and $W_q$ corresponding to the respective users p and q, which are derived by the machine learning model 31 for user discrimination, are assigned to the user embeddings $u_p$ and $u_q$, respectively, in the pooling layer 203 of the machine learning model 32 for group embedding generation to generate the weighted user embeddings 702 and 703, respectively.

The weighted user embeddings 702 and 703 are aggregated into a single group embedding $g_{lo}$ in the pooling layer 203 of the machine learning model 32 for group embedding generation and output from the output layer 205.

More specifically, the group embedding $g_{lo}$ is derived by Equation 2 below.

$$g_{lo} = \sum_{u_t \in group\, l} w_{to} u_t \qquad \text{(Equation 2)}$$

where $g_{lo}$ denotes the group embedding obtained as the sum of weighted user embeddings of users belonging to user group l. $W_{to}$ denotes the attention weight for the target item o and $u_t$ is the user embedding for user t.

This group embedding $g_{lo}$ is an embedding specific to the target item o.

Referring to FIG. 8, the group embedding $g_{lo}$, which is output by the machine learning model 32 for group embedding generation shown in FIG. 7, and the item embedding $i_o$ of the target item are input to the representation layer 301 of the machine learning model 33 for item recommendation.

Also, a group embedding $b_l$ that is specific to user group l may be input to the representation layer 301 of the machine learning model 33 for item recommendation. The group embedding $b_l$ is an embedding with features of attributes specific to the user group independent of item o, which is independent of the group embedding $g_{lo}$ generated by aggregating user embeddings $u_p$ and $u_q$. In this case, the group embedding $f_{lo}$ may be calculated by adding the group embedding $b_l$, which is specific to the user group, to the group embedding $g_{lo}$, which are generated by aggregating the user embeddings as in Equation 3 below, and supplied to the pooling layer 802 at a later stage.

$$f_{lo} = g_{lo} + b_l \qquad \text{(Equation 3)}$$

As such, by adding the item-independent group embedding, which is specific to the user group, to the group embedding aggregated from the user embeddings, it makes it possible to reflect attributes that are more specific to each user group, such as age segment, residence and work location segment, annual income and hobbies segment, and the like, in the score calculation.

In the pooling layer 802 of the machine learning model 33 for item recommendation, the group embedding $f_{lo}$ is concatenated to the item embedding $i_o$ of the target item o to generate a group-item concatenated embedding. The group-item concatenated embedding $e_{lo}$ may be concatenated as in Equation 4 below.

$$e_{lo} = \text{concatenate}(f_{lo}, i_o, f_{lo} \odot i_o) \qquad \text{(Equation 4)}$$

In Equation 4, the group-item concatenated embedding $e_{lo}$ is an embedding that concatenates three embeddings: the group embedding $f_{lo}$; the item embedding $i_o$; and the element-by-element product or Hadamard product of the group embedding and the item embedding.

Although the element-by-element product of a group embedding and the item embedding is effective for predicting the preference of a user group for an item because the element-by-element product models the interaction between the two embeddings, the original information is missing due to calculation operation. In order to compensate for this missing information, according to the present embodiment, the group embedding $f_{lo}$ and the item embedding $i_o$ are further concatenated to the element-by-element product.

The group-item concatenated embedding $e_{lo}$ is supplied as pooling vectors to the later Multi-Layer Perception (MLP) 803 and propagated through the multiple layers of the MLP 803 to output a score $\hat{y}_{lo}$. The score $\hat{y}_{lo}$ output from the MLP 803 is a score that predicts the preference of the user group l for the item o and serves as an indicator of the advertising effectiveness of recommending the item o. The MLP 803 is a stack of multiple fully connected layers, which allows the machine learning model 33 for item recommendation to obtain nonlinear and higher-order correlations between users, user groups, and items.

Referring to FIG. 8, the machine learning model 33 for item recommendation may also output the score that predicts the preferences of respective users for the item o, together with the score $\hat{y}_{lo}$ that predicts the preference of the user group l for item o at the same time. In this case, as in the case of inputting the group embedding, the user embedding $u_p$ of the target user p is input to the representation layer 301 of the machine learning model 33 for item recommendation together with the item embedding $i_o$ of the target item o, and in the pooling layer 802, the user embedding $u_p$ is concatenated to the item embedding $i_o$ in the same manner as in Equation 4 to generate a user-item concatenated embedding. The user-item concatenated embedding generated here is an embedding that concatenates three embedding: the user embedding $u_p$, the item embedding $i_o$, and the element-by-element product or the Hadamard product of the user embedding and the item embedding.

The user-item concatenated embedding is supplied as a pooling vector to the later Multi-Layer Perception (MLP) 803 and propagated through the multiple layers of the MLP 803 to output a score $\hat{X}_{po}$. This score $\hat{x}_{po}$ output by the MLP 803 is a score that predicts the preference of the user p for the item o and serves as an indicator of the advertising effectiveness of recommending item o.

As described above, outputting the score that predicts the preferences of a user group shares the model parameters inclusive in the same machine learning model 33 for item recommendation with outputting the score that predicts the preferences of users belonging to that group. Thus, information on the interaction between individual users and the item is additionally applied to the machine learning model 33 for item recommendation. As a result, it makes it possible to learn the group embedding of the user group more accurately.

The Multi-Layer Perceptron (MLP) shown in FIG. 8 is one of the forward propagating neural networks consisting of multiple layers, that is, at least an input layer, an intermediate, hidden layer, and an output layer. In the MLP, the nodes in respective layers, except the input nodes, operates as perceptron, respectively, and the sum of the weighted inputs is input to a nonlinear activation function to obtain the output to the next layer.

It should be noted that the machine learning model 33 for item recommendation shown in FIG. 8 may be implemented, for example, in Neural Collaborative Filtering (NCF), which learns the interaction (i.e., interrelationship) between a user and an item based on the user's behavior history for the item.

Pre-Training of Respective Machine Learning Models

Figure 9:
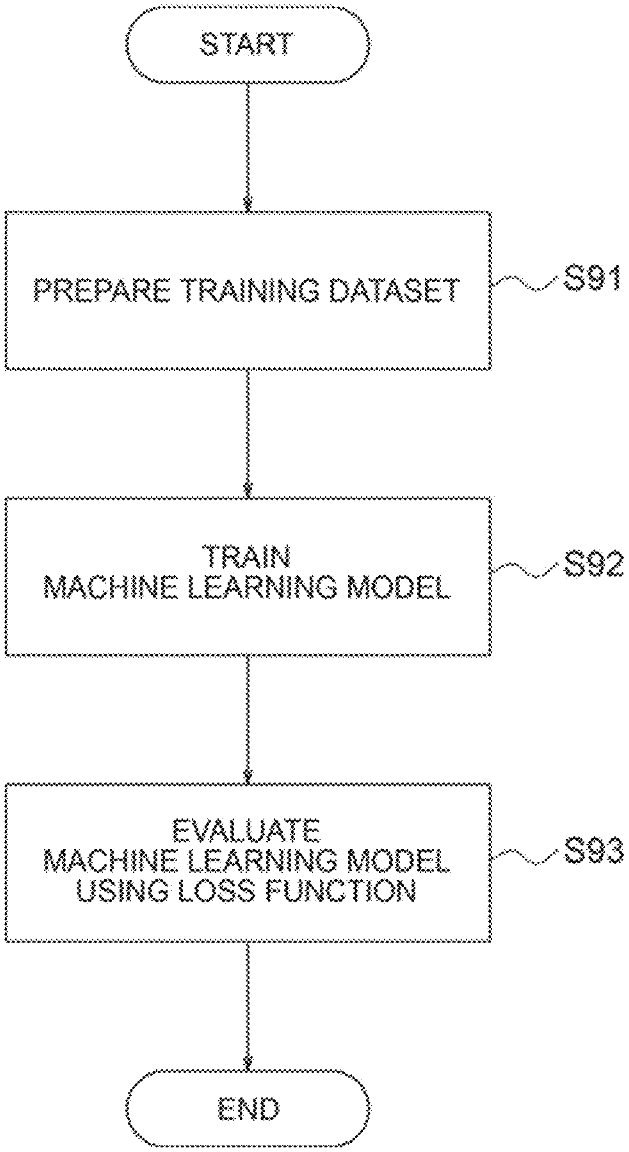
FIG. 9 is a flowchart illustrating an exemplary detailed processing procedure of the processing to pre-train respective machine learning models according to the present embodiment.

FIG. 9 is a flowchart illustrating an exemplary detailed processing procedure of the processing to pre-train respective machine learning models.

Referring to FIG. 9, in step S91, the pre-training unit 17 of the group recommendation apparatus 1 prepares training data sets for pre-training respective machine learning models and stores the prepared training data sets in a storage device.

More specifically, the training data set prepared for the machine learning model 31 for user discrimination includes training data in which the frequencies of user interactions with the items (e.g., item purchase frequency) are labelled in the user behavior history information, which is the behavior histories for items included in the e-commerce usage history 21, the prices of items included in the item information are labelled, and the attention weights of users in the user group are annotated as the ground truth data to the pairs of the user behavior history information and the item information. The ground truth data of the attention weights of users may be obtained by back propagation from the results of item recommendations, for example, the recommendations led to more purchases, or to greater advertising effectiveness, or the recommendations were rated highly in user reviews, and the like.

The training data set prepared for a machine learning model integrating the machine learning model 32 for group embedding generation and the machine learning model 33 for item recommendation may each include training data in which evaluation values (e.g., ratings obtained from user reviews) or evaluation ranks are annotated as the ground truth data to the pairs of the user behavior history information, which is the behavior histories of users for items, and the item information.

In step S92, the pre-training unit 17 inputs the training data set prepared in step S91 to each of the machine learning models and trains each of the machine learning models.

In step S93, the pre-training unit 17 repeats the pre-training of each of the machine learning models until the loss between the output produced by each of the machine learning models in step S92 and the ground truth data is below a predetermined threshold for loss.

More specifically, for example, when respective machine learning models 31, 32, and 33 are integrated into a single machine learning model, in order to evaluate the pre-training and to optimize the inference results, the pre-training unit 17 may apply the $\hat{y}_{lo}$, which represents the score of the preference of the user group l for the item o output by the machine learning model, to a given loss function, and repeat the pre-training so as to make the loss smaller.

For example, when no explicit feedback to scores or item recommendation results based on the scores is available, a regression-type pairwise loss function as shown in Equation 5 below may be used.

$$\mathcal{L} = \sum_{l,o,u} (\hat{y}_{lo} - \hat{y}_{lu} - 1) \quad \text{(Equation 5)}$$

where l is the target user group, o is the target item, and u is the negative sample, i.e., the item with which the target user group has no interaction.

Alternatively, when explicit feedback on scores and item recommendation results based on the scores is available from, for example, user review ratings, a Mean Square Error (MSE) loss function may be used, as shown in Equation 6 below.

$$\mathcal{L} = \sum_{l,o} (y_{lo} - \hat{y}_{lo})^2 \quad \text{(Equation 6)}$$

where $y_{lo}$ is the ground truth score obtained as feedback on the item recommendation.

As described above, according to the present embodiment, the group recommendation apparatus encodes the behavior history of a user for an item, extracts, for each of users, the preference of the user for the item, derives, for each of users, a weight indicating the criticality of the user within the user group using the information of items, weights the extracted preference of the user with the derived weight, and aggregates the weighted preferences to generate the preference of the user group to which the user belongs. Here, the weights for respective users are derived differently according to the target user's transactions for the item and the correlation with the item information. The group recommendation apparatus 1 further predicts a score indicating the preference of the user group for the item from the generated preference of the user group and corresponding item information.

As a result, even for a large-scale group with a large number of users, it makes it possible to derive the preference of the group to which users belongs more appropriately with higher accuracy from the preferences of users for items with simplified configuration. Accordingly, it makes it possible to realize more effective recommendation of items for a large-scale user group consisting of various users who use e-commerce sites.

Hardware Configuration of Group Recommendation Apparatus

Figure 10:
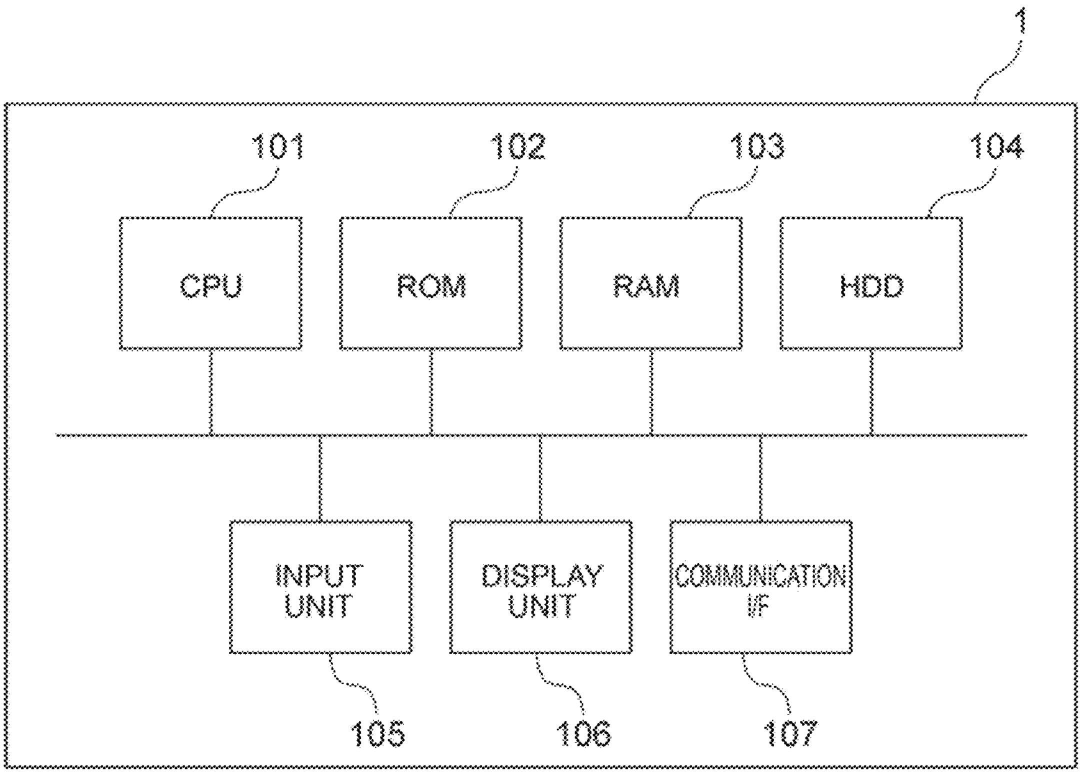
FIG. 10 is a block diagram illustrating an exemplary hardware configuration of the group recommendation apparatus 1 according to the respective embodiments of the present invention.

FIG. 10 is a diagram showing a non-limiting exemplary hardware configuration of the group recommendation apparatus 1 according to the present embodiment.

The group recommendation apparatus 1 according to the present embodiment can be implemented on any one or more computers, mobile devices, or any other processing platform.

Referring to FIG. 10, the group recommendation apparatus 1 is shown as being implemented on a single computer, however, the group recommendation apparatus 1 according to the present embodiment may be implemented on a computer system including multiple computers. The multiple computers may be inter-communicatively connected by a wired or wireless network.

As shown in FIG. 10, the group recommendation apparatus 1 includes a CPU 101, a ROM 102, a RAM 103, an HDD 104, an input unit 105, a display unit 106, a communication I/F 107, and a system bus 108. The group recommendation apparatus 1 may also incorporate an external memory.

The CPU 101 controls operations of the group recommendation apparatus 1 in an integrated manner and controls the respective components (102 to 107) via the system bus 108 serving as a data transmission channel. It should be noted that, in place of or in addition to the CPU 101, the group recommendation apparatus 1 may also be equipped with a GPU (Graphics Processing Unit), and the GPU may be used to perform the learning and inference processing for the machine learning models 31 to 33.

The ROM (Read Only Memory) 102 is a non-volatile memory that stores a control program or the like required for CPU 101 to execute the processes. Instead, the program may be stored in a non-volatile memory such as the HDD (Hard Disk Drive) 104 or an SDD (Solid State Drive) or the like, or an external memory such as a removable storage medium (not shown).

The RAM (Random Access Memory) 103 is a volatile memory and functions as a main memory or a work area, or the like, for the CPU 101. In other words, the CPU 101 loads a required program or the like from the ROM 102 into the RAM 103 at the time of executing the processes and executes the program or the like to realize various functional operations.

The HDD 104 stores, for example, various data and various information required when the CPU 101 performs a process using a program. Furthermore, the HDD 104 stores, for example, various data and various information obtained by the CPU 101 performing a process using a program or the like.

The input unit 105 is constituted with a keyboard or a pointing device such as a mouse.

The display unit 106 is constituted with a monitor such as a liquid crystal display (LCD). The display unit 116 may provide a GUI (Graphical User Interface) for input various parameters used in the machine learning processing and communication parameters used in communication with external devices, and the like, to the group recommendation apparatus 1.

The communication I/F 107 is an interface for controlling communication between the group recommendation apparatus 1 and the external devices.

The communication I/F 107 provides an interface to the network and executes communication with external devices via the network. Image data, various parameters, and other data are sent and received to and from the external device via the communication I/F 107. According to the present embodiment, the communication I/F 107 may execute communication via a wired LAN (Local Area Network) that conforms to communication standards such as Ethernet (registered trademark) or leased line. However, the network available in the present embodiment is not limited thereto and may be constituted with a wireless network. The wireless network may include a wireless PAN (Personal Area Network) such as Bluetooth (registered trademark), ZigBee (registered trademark), UWB (Ultra Wide Band), and the like. The wireless network may also include a wireless MAN (Metropolitan Area Network) such as Wi-Fi (Wireless Fidelity) (registered trademark), and the like. The wireless network may further include a wireless WAN (Wide Area Network) such as LTE/3G, 4G, 5G, and the like. It should be noted that the network need only be capable of connecting respective devices and allowing them to communicate with each other, and the communication standards, scale, and configuration are not limited to the above.

Functions of at least some of the elements of the group recommendation apparatus 1 shown in FIG. 1 may be realized by the CPU 101 executing programs. Nevertheless, at least a part of the functions of the elements of the group recommendation apparatus 1 shown in FIG. 1 may operate as a dedicated hardware. In this case, the dedicated hardware operates based on the control of the CPU 101.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

Embodiments of Present Disclosure

The present disclosure includes the following embodiments.

[1] An information processing apparatus, comprising: an encoding unit configured to encode a behavior history of a user for an item to generate a first embedding for each user; a weighting unit configured to derive a weight for each user based on information on a price of the item and the behavior history, and weight the first embedding generated by the encoding unit with the derived weight; and an aggregation unit configured to aggregate the first embedding weighted by the weighting unit to generate, for a group to which the user belongs, a second embedding indicating a preference of the group for the item.

[2] The information processing apparatus according to [1], wherein the weighting unit derives the weight for the user differently depending on the price of the item.

[3] The information processing apparatus according to [1] or [2], wherein the weighting unit derives the weight such that the lower the price of the item, the greater the weight.

[4] The information processing apparatus according to any one of [1] to [3] 1, wherein the weighting unit derives the weight based on the information on the price of the item and a purchase frequency of items of the user on an e-commerce site, the purchase frequency being encoded in the first embedding.

[5] The information processing apparatus according to any one of [1] to [5], wherein the encoding unit further encodes the information on the price of the item to generate a third embedding, and the weighting unit derives the weight based on the information on the price of the item encoded in the third embedding.

[6] The information processing apparatus according to any one of [1] to [5], wherein the weighting unit derives the weight by applying, to the first embedding, a first machine learning model that is trained with the information on the price of the item and the behavior history.

[7] The information processing apparatus according to [6], wherein the first machine learning model is trained to output the weight such that the lower the price of the item, the greater the weight.

[8] The information processing apparatus according to [6] or [7], wherein the first machine learning model implements an activation function that uses the price of the item and a purchase frequency of items of the user on an e-commerce site as variables to derive the weight.

[9] The information processing apparatus according to any one of [1] to [8], further comprising: a prediction unit configured to concatenate the second embedding of the group to a third embedding that encodes the information on the price of the item, and propagate the concatenated embedding in a multi-layer neural network to predict a score of the group for the item.

[10] The information processing apparatus according to [9], wherein the prediction unit further concatenates the second embedding and the third embedding to the concatenated embedding, and propagates the further concatenated embedding in the multi-layer neural network.

[11] The information processing apparatus according to [9] or [10], wherein the prediction unit adds a fourth embedding that encodes an attribute specific to the group to the second embedding of the group, and concatenates the second embedding to which the fourth embedding is added to the third embedding.

[12] The information processing apparatus according to any one of [9] to [11], wherein the prediction unit further concatenates the third embedding of the item to the first embedding of the user, and propagates the concatenated embedding in the multi-layer neural network to predict a score of the user for the item, simultaneously with the score of the group for the item.

[13] The information processing apparatus according to any one of [9] to [12], wherein the prediction unit shares the multi-layer neural network for predicting the score of the group for the item and for predicting the score of the user for the item.

[14] An information processing method executed by an information processing apparatus, comprising steps of: encoding a behavior history of a user for an item to generate a first embedding for each user; deriving a weight for each user based on information on a price of the item and the behavior history, and weighting the first embedding with the derived weight; and aggregating the weighted first embedding to generate, for a group to which the user belongs, a second embedding indicating a preference of the group for the item.

[15] A computer readable storage medium storing an information processing program for causing a computer to execute information processing, the information processing program causing the computer to execute processing comprising: an encoding process for encoding a behavior history of a user for an item to generate a first embedding for each user; a weighting process for deriving a weight for each user based on information on a price of the item and the behavior history, and weight the first embedding generated by the encoding process with the derived weight; and an aggregation process for aggregating the first embedding weighted by the weighting process to generate, for a group to which the user belongs, a second embedding indicating a preference of the group for the item.

REFERENCE SIGNS LIST

1: Group Recommendation Apparatus; 2: Transaction Information Storage Device; 3: Machine Learning Model Storage Device; 11: Input Unit; 12: Encoding Unit; 13: Weighting Unit; 14: Aggregation Unit; 15: Group Preference Prediction Unit; 16: Recommended Item Output Unit; 17: Pre-training Unit; 21: EC Site Usage History; 22: Item Information; 31: Machine Learning Model for User Discrimination; 32: Machine Learning Model for Group Embedding Generation; 33: Machine Learning Model for Item Recommendation; 101: CPU; 102: ROM; 103: RAM; 104: HDD; 105: Input Unit; 106: Display Unit; 107: Communication I/F; 108: System Bus

What is claimed is:

1. An information processing apparatus, comprising:

at least one memory configured to store program code; and at least one processor configured to operate as instructed by the program code, the program code comprising:

encoding code configured to cause the at least one processor to encode a behavior history of a user for an item to generate a first embedding for each user;

weighting code configured to cause the at least one processor to derive a weight for each user based on information on a price of the item and the behavior history, and weight the first embedding generated by with the derived weight;

aggregation code configured to cause the at least one processor to aggregate the first embedding weighted to generate, for a group to which the user belongs, a second embedding indicating a preference of the group for the item; and prediction code configured to cause the at least one processor to predict a score of the group of the item by a multi-layer neural network comprising a presentation layer, a pooling layer, a hidden layer, and a prediction layer, wherein the prediction of the score comprises:

updating, by the presentation layer of the multi-layer neural network, the second embedding by adding a fourth embedding that encodes an attribute specific to the group to the second embedding;

concatenating, by the pooling layer of the multi-layer neural network, the updated second embedding to a third embedding that encodes the information on the price of the item; and propagating the concatenated embedding into the hidden layer of the multi-layer neural network so that the prediction layer predicts the score; and output code configured to cause the at least one processor to cause the list of items to be displayed based on the score of the group for the item.

2. The information processing apparatus according to claim 1, wherein the weighting code is further configured to cause the at least one processor to derive the weight for the user differently depending on the price of the item.

3. The information processing apparatus according to claim 1, wherein the weighting code is further configured to cause the at least one processor to derive the weight such that the lower the price of the item, the greater the weight.

4. The information processing apparatus according to claim 1, wherein the weighting code is further configured to cause the at least one processor to derive the weight based on the information on the price of the item and a purchase frequency of items of the user on an e-commerce site, the purchase frequency being encoded in the first embedding.

5. The information processing apparatus according to claim 1, wherein the encoding code is further configured to cause the at least one processor to further encode the information on the price of the item to generate a third embedding, and the weighting code is further configured to cause the at least one processor to derive the weight based on the information on the price of the item encoded in the third embedding.

6. The information processing apparatus according to claim 1, wherein the weighting code is further configured to cause the at least one processor to derive the weight by applying, to the first embedding, a first machine learning model that is trained with the information on the price of the item and the behavior history.

7. The information processing apparatus according to claim 6, wherein the first machine learning model is trained to output the weight such that the lower the price of the item, the greater the weight.

8. The information processing apparatus according to claim 6, wherein the first machine learning model implements an activation function that uses the price of the item and a purchase frequency of items of the user on an e-commerce site as variables to derive the weight.

9. The information processing apparatus according to claim 1, wherein the prediction code is further configured to cause the at least one processor to further concatenate the second embedding and the third embedding to the concatenated embedding, and propagates the further concatenated embedding in the multi-layer neural network.

10. The information processing apparatus according to claim 1, wherein the prediction code is further configured to cause the at least one processor to further concatenate the third embedding of the item to the first embedding of the user, and propagate the concatenated embedding in the multi-layer neural network to predict a score of the user for the item, simultaneously with the score of the group for the item.

11. The information processing apparatus according to claim 1, wherein the prediction code is further configured to cause the at least one processor to share the multi-layer neural network for predicting the score of the group for the item and for predicting the score of the user for the item.

12. An information processing method, performed by at least one processor and comprising:

encoding a behavior history of a user for an item to generate a first embedding for each user;

deriving a weight for each user based on information on a price of the item and the behavior history, and weighting the first embedding with the derived weight;

aggregating the weighted first embedding to generate, for a group to which the user belongs, a second embedding indicating a preference of the group for the item;

predicting a score of the group of the item by a multi-layer neural network comprising a presentation layer, a pooling layer, a hidden layer, and a prediction layer, wherein the predicting of the score comprises:

updating, by the presentation layer of the multi-layer neural network, the second embedding by adding a fourth embedding that encodes an attribute specific to the group to the second embedding;

concatenating, by the pooling layer of the multi-layer neural network, the updated second embedding to a third embedding that encodes the information on the price of the item; and propagating the concatenated embedding into the hidden layer of the multi-layer neural network so that the prediction layer predicts the score;

causing a list of items to be displayed based on the score of the group for the item.

13. A non-transitory computer readable storage medium storing an information processing program for causing a computer to execute information processing, the information processing program causing the computer to execute processing comprising:

an encoding process for encoding a behavior history of a user for an item to generate a first embedding for each user;

a weighting process for deriving a weight for each user based on information on a price of the item and the behavior history, and weight the first embedding generated by the encoding process with the derived weight;

an aggregation process for aggregating the first embedding weighted by the weighting process to generate, for a group to which the user belongs, a second embedding indicating a preference of the group for the item;

a prediction process for predicting a score of the group of the item by a multi-layer neural network comprising a presentation layer, a pooling layer, a hidden layer, and a prediction layer, wherein the predicting of the score comprises:

updating, by the presentation layer of the multi-layer neural network, the second embedding by adding a fourth embedding that encodes an attribute specific to the group to the second embedding;

concatenating, by the pooling layer of the multi-layer neural network, the updated second embedding to a third embedding that encodes the information on the price of the item; and propagating the concatenated embedding into the hidden layer of the multi-layer neural network so that the prediction layer predicts the score;

an output process for causing a list of items to be displayed based on the score of the group for the item.

* * * * *